Sept. 26, 1950  E. A. MADDUX  2,523,536

FISH LURE

Filed Jan. 30, 1948

Eddy A. Maddux INVENTOR.

BY M. J. Charles
ATTORNEY

Patented Sept. 26, 1950

2,523,536

UNITED STATES PATENT OFFICE 2,523,536

FISH LURE

Eddy A. Maddux, Wichita, Kans.

Application January 30, 1948, Serial No. 5,310

3 Claims. (Cl. 43—42.03)

My invention relates to an improvement in artificial lures for gamefish.

The object of my invention is to provide lures of the kind mentioned that have the following qualities of attraction. They are both visual and audible, and have a lifelike movement. This lifelike movement creates an action or a surface disturbance on the water thus attracting the fish more readily.

A further object of my invention is to provide a lure of the kind mentioned that has both a head and a body that move separate to each other and the regular fishing line goes through a hole in the head to fasten to the body. In this manner the body is pulled and the head is pushed by the body through the water.

A still further object of my invention is to provide a lure of the kind mentioned that has a novel design and a coloration that is attractive to fish.

A still further object of my invention is to provide a lure of the kind mentioned that can either be a casting model weighing approximately 5/8 ounce or a flyrod or spinning model weighing approximately 1/16 ounce.

A still further object of my invention is to provide a lure of the kind mentioned that can support one or a plurality of hooks thereon and one that floats on the water with a portion of the lure extending above the surface of the water.

A still further object of my invention is to provide a lure of the kind mentioned that is neat and attractive in design, sturdy in construction, and cheap to build and sell, and one that is durable and long lived.

Now referring to the accompanying drawings in which similar numerals of reference designate the same parts throughout the several figures of the drawings:

Fig. 6 is a cross sectional view of the head portion of my fish lure device, this view being as seen from the line 2—2 in Fig. 5 and looking in the direction of the arrows.

Figure 1:
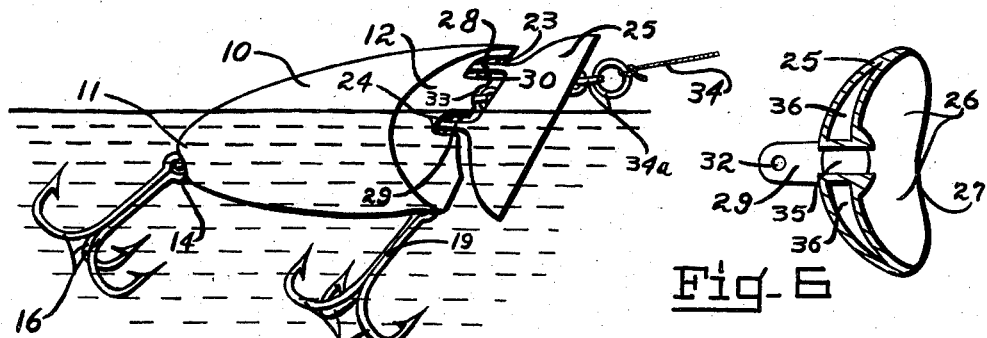
Fig. 1 is a side view of my fish lure device showing how the lure rides in the water.
Figure 2:
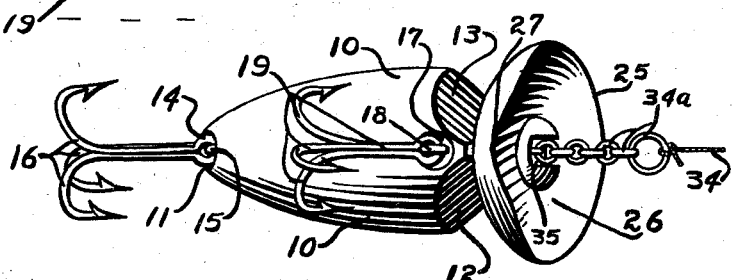
Fig. 2 is a bottom view of my fish lure device.
Figures 3, 5:
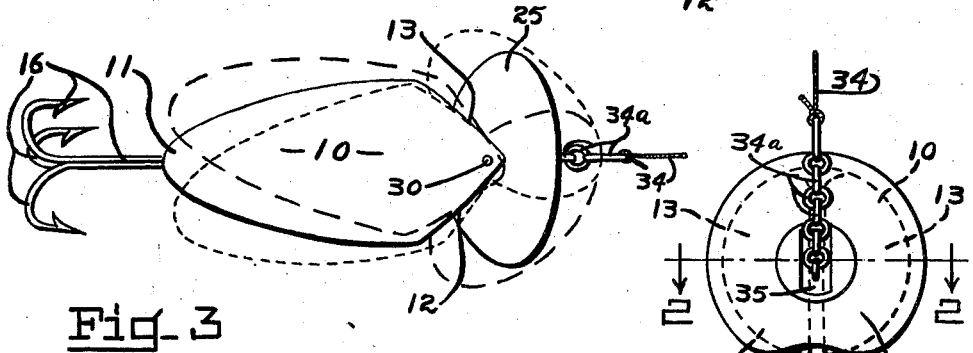
Fig. 3 is a top view of my fish lure device, the dotted lines in this view showing how the lure moves from side to side in the water as it is pulled along.
Fig. 5 is a front view of my fish lure device.

In the drawings, the body 10 of the lure is tapered to a blunt point 11 from the front to the back, the forward portion of the body 10 having two tapered portions 12 and 13 that make the front end of the body 10 V-shaped. The purpose of this V-shape will be later described. At the extreme rear end 11 of the body 10 is located a dimple 14. The dimple 14 is for the purpose of receiving a screw eye 15 which in turn moveably holds a forked hook 16 securely therein.

Located on the bottom of the body 10 and at the forward end is a second dimple 17 for the purpose of receiving a screw eye 18 which in turn movably holds a forked hook 19 securely therein.

Figure 4:
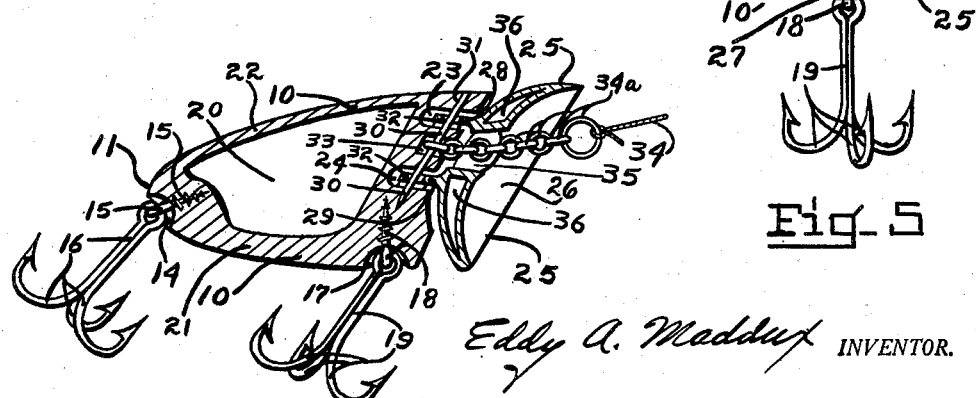
Fig. 4 is a longitudinal sectional view of my fish lure device showing all parts clearly.

The body 10 is hollow as shown in Fig. 4 as at 20 and the bottom wall 21 is much thicker than the top wall 22. The reason for this extra thickness in the bottom wall 21 is for extra weight to keep the lure right side up in the water at all times. In the forward portion of the body 10 and near the top is a cut out portion or deep notch 23. A short distance below the cut out portion or deep notch 23 is located a second deep notch 24 which is an exact duplicate of the notch 23. The purpose of these two deep notches 23 and 24 will be readily understood as this description progresses.

In the drawings is shown a head portion 25 that is loosely positioned directly in front of the body 10, the head portion 25 has a broad concave face 26 and at the bottom portion thereof is a curved cut out portion 27 that is used as a water escape as the lure is used in the water. On the back of the head portion 25 is located a pair of rearwardly extending leg elements 28 and 29. The upper rearwardly extending leg element 28 fits into the upper deep notch portion 23. The lower rearwardly extending leg element 29 fits into the lower deep notch portion 24 of the body 10 and a pin 30 is inserted in a hole 31 formed in the body 10 and extends on down through a matching hole 32 in both rearwardly extending leg elements 28 and 29 and in so doing rockably fastens and holds the head portion 25 onto the body 10 of the lure. Now located in the body 10 and midway between the two deep notch portions 23 and 24 is a hole 33 formed in the body 10. The purpose of this hole 33 is to receive the end of a fishing line 34 which can be a chain 34a as shown in the drawings or a wire, or any means of fastening the lure to the line. The chain 34 loosely extends through a hole 35 in the head portion 25 and into the hole 33 of the body 10 and is also fastened and securely held to the pin 30 by this type of fastening. The head portion 25 is pushed through the water by the body 10. When the lure is towed in this manner the head 25 catching the water is free and will move or rock from side to side with a wobbly motion. This movement of the head 25 creates a splashing, paddling, disturbance in the water attracting fish. The movement of the head 25 is limited in its oscillation by the line lead 34a which runs through the hole 35 in the head portion 25. The larger the hole 35, the farther the head 25 will turn, the line lead 34a being flexible gives a certain spring effect or resilience which bears against the perimeter of the hole 35 through the head 25, causing the head 25 to reverse its direction at the end of its rocking movement.

The head 25 as shown in the two cross sectional views Fig. 4 and Fig. 6 is as much as possible hollow in the center as at 36 the same as the body 10 as at 20.

Now while the device as shown and above described is probably the preferred form of the device, it is to be understood that such modifications of the inventon may be employed as lie within the scope of the appended claims without departing from the spirit and the intention of the invention.

Now having fully shown and described my invention what I claim is:

1. In a fish lure device of the kind described; said lure device having a body portion and a head portion, the front end of the said body portion being V-shaped, the apex of the V-shape being a concave curve substantially from top to bottom of the body element, said head portion being substantially annular in shape and having a convex back and concave front face and having an opening through the head porton at the central portion thereof, the convex back of the head portion being positioned immediately adjacent the apex curve of the V-shape of the said body portion, a pair of hinge legs, said hinge legs being positioned one above and one below the opening through the said head portion and extending rearwardly from the said head portion and being rigidly carried thereby, said body portion having two spaced apart recesses in the apex portion of the V-formation of the said body portion, said apex portion of the V-shaped portion of said body portion having a third recess therein that is positioned between the first and second said recesses, said hinge legs being positioned one in each of the first and second said recesses, a flexible tow element, one end of said tow element loosely passing through the opening in the said head portion and terminating in the third said recess in the apex portion of the V-shaped portion of the said body portion, a pivot pin, said pivot pin passing through the said apex portion of the V-shaped body portion and recesses therein and through the said hinge legs and end of the said tow element positioned in said recesses, and fish hook elements carried by the said body portion.

2. In a fish lure device of the kind described; the structure defined in claim 1, said head portion and body portion being lighter in weight than their equal volume of water, the lower edge portion of the said head portion having an inwardly receding portion to provide a water passage way to assist in oscillating movements of the head which will be imparted to the body portion as the lure is towed through the water.

3. In a fish lure device of the kind described; the structure defined in claim 1, said head portion and body portion being lighter in weight than their equal volume of water, the lower edge portion of the said head portion having an inwardly receding portion to provide a water passage way to assist in oscillating movements of the head which will be imparted to the body portion as the lure is towed through the water, said lure device being heavier at the bottom than at the top to maintain a right side up position of the lure in the water.

EDDY A. MADDUX.

REFERENCES CITED

The following references are of record in the file of this patent:

UNITED STATES PATENTS

| Number | Name | Date |
| --- | --- | --- |
| 1,692,935 | Heddon | Nov. 27, 1928 |
| 1,934,158 | Yarvice | Nov. 7, 1933 |
| 1,993,798 | Peterson | Mar. 12, 1935 |
| 2,008,250 | Haas | July 16, 1935 |
| 2,036,075 | Peterson | Mar. 31, 1936 |
| 2,112,401 | Anderson | Apr. 5, 1938 |